June 4, 1963
B. M. TOMBERLIN
3,092,514
METHOD AND APPARATUS FOR CLEANING AND
THAWING FLOW LINES AND THE LIKE
Filed May 25, 1959
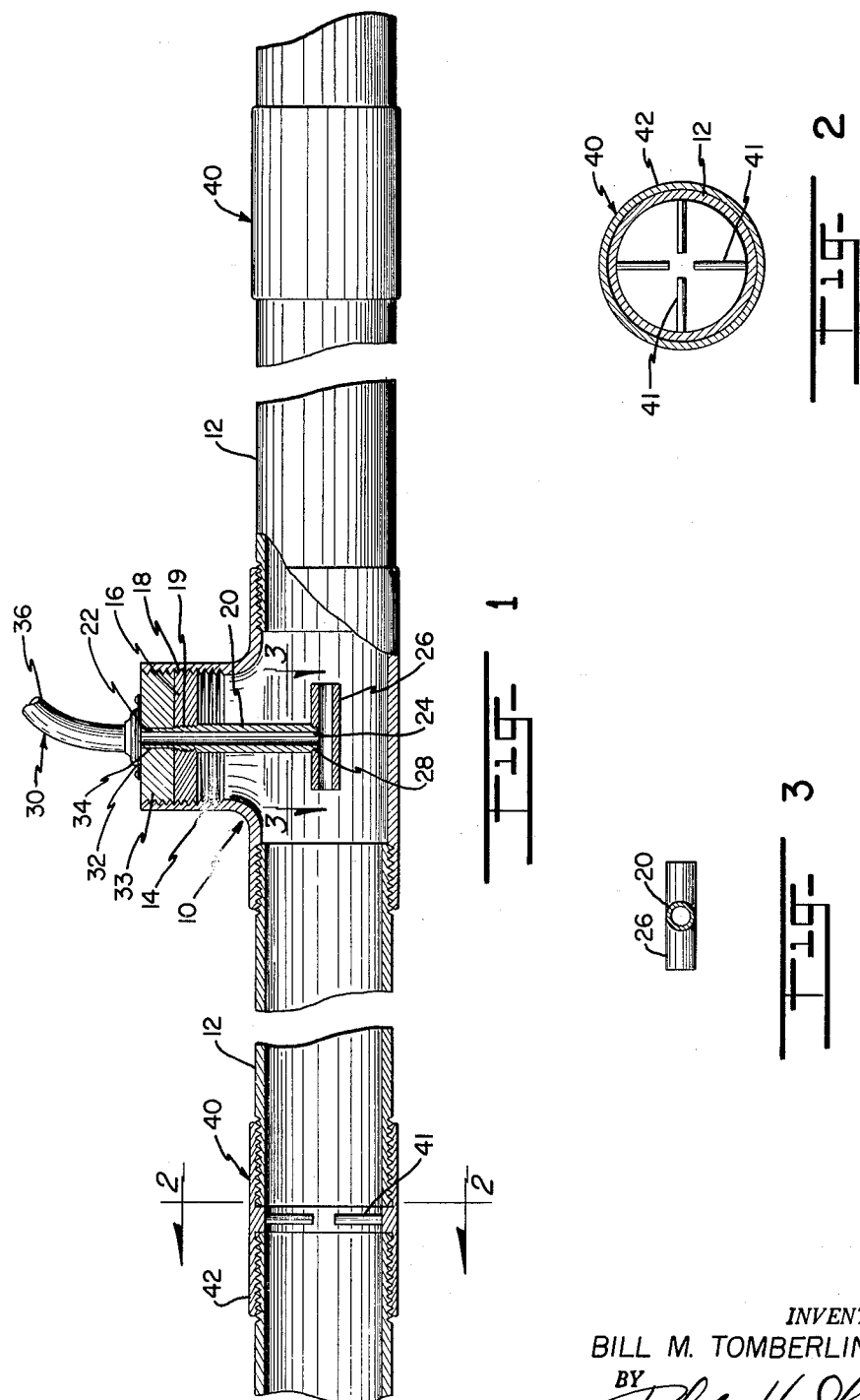
INVENTOR.
BILL M. TOMBERLIN
BY
*Philip H. Sheridan*
ATTORNEY United States Patent Office 3,092,514
Patented June 4, 1963

3,092,514
METHOD AND APPARATUS FOR CLEANING AND THAWING FLOW LINES AND THE LIKE
Bill M. Tomberlin, Denver, Colo., assignor to Petro-Electronics Corporation, Denver, Colo., a corporation of Delaware
Filed May 25, 1959, Ser. No. 815,337
3 Claims. (Cl. 134—1)

This invention relates to a novel and improved method and apparatus for use in the thawing and cleaning of flow lines and the like and more particularly relates to a method and apparatus of employing high frequency energy of predetermined wave lengths in the cleaning of flow lines for organic fluids, fatty waxes and in general any fluid having a relatively low dielectric loss factor.

In the transportation and storage of fluids, many fluids exhibit a tendency to deposit or solidify at least partially and through continued usage the transporting or storage medium may become unduly clogged or restricted so as to materially reduce its efficiency. For example in the passage of organic fluids such as oil and gas through flow lines, precipitates such as paraffin of the fluids are often deposited along the inside of the flow lines and their thickness tends to build up and increase through continued line usage until the fluid passage therealong is greatly restricted. In addition, organic fluids will undergo an increase in viscosity when subjected to reduce temperatures and pressures in the flow line together with the formation and precipitation of waxes.

Various means have been devised for the cleaning and thawing of flow lines or storage tanks and the like, such as through the application of heat through the flow line or by mechanical scraping devices and, in accordance with the present invention, it is proposed to provide for a greatly improved method of clearing flow lines. This invention is therefore directed to the application of high frequency electrical energy to various transporting and storage mediums for organic fluids in such a way that the energy is transferred instantaneously therealong over considerable distances whereupon it is converted into heat energy by the organic fluids, especially the precipitates thereof collected along the interior surface of the flow line, to thereby accomplish the melting or refluidizing and reduction in viscosity of the precipitates and organic fluids, respectively.

It is an object of the present invention to provide for a novel and improved method and apparatus for clearing flow lines and the like whereby expensive heat conducting equipment is eliminated and provision is made for a compact and relatively inexpensive attachment whereby electrical energy may be generated by a portable installation for selective application through the attachment to accomplish the most efficient and instantaneous transfer of heat energy throughout the flow line.

It is a further object to provide for a novel and improved method and apparatus which is operative to transfer electrical energy for extensive and selected distances through a flow line and the like to thereby establish the fluidization and reduction in viscosity of organic fluids, and moreover in such a way that with an increase of heat and accompanying gradual reduction in viscosity of the fluids the dielectric constant is lowered and the distance of travel of electrical energy through the flow line is correspondingly increased.

In accordance with the present invention, instantaneous heating of organic fluids in flow lines may be obtained through the application of high frequency electrical energy of a predetermined wave length, and preferably radio frequency energy in the microwave region and of a wave length such that the tubing acts essentially as a hollow wave guide for the transfer and propagation of energy along the interior surface thereof. In this manner a skin effect is effectively produced along the interior surface of the pipe and the energy may be transferred for considerable distances, especially when filled with organic fluids, since fluids of this type have relatively low dielectric loss factors. At the same time, the dielectric loss factor of the fluids and precipitates collected along the interior of the tubing or pipe line is sufficient to cause some attenuation of the high frequency energy into heat, and the heat generated together with the characteristics of the electrical energy have a pronounced effect in the depolymerization and reduction in viscosity of the organic fluids and the precipitates thereof. Since the flow pattern of the energy is along the interior surface of the flow line, primary heat conversion will occur at this location through the skin effect produced. However, and especially where the high frequency energy is in the microwave region, the flux lines extending inwardly from the surface of the pipe will have the secondary effect of reducing the viscosity of the organic fluid flowing therethrough by conversion into heat.

Other objects and advantages of the present invention will become more apparent from the following detailed description taken together with the accompanying drawings, in which:

FIGURE 1 is an elevational view partly in section illustrating the manner of installation of a wave guide into a pipeline;

FIGURE 2 is a cross sectional view taken on line 2—2 of FIGURE 1; and

FIGURE 3 is a cross sectional view taken on the line 3—3 of FIGURE 1.

Referring more particularly to the drawings, there is shown by way of illustrative example in the figures a T-head connection 10 attached into a flow line 12. The T-head connection may be of a standard type wherein the cross portion 13 is interiorly threaded at each end thereof for connection with the exteriorly threaded ends of the pipe line sections. In addition, the stem 14 of the T is also interiorly threaded to provide for insertion therein of a coupling member 16 preferably formed of a discoidal plug as at 18 composed of Teflon or other non-dielectric material of sufficient strength to withstand line pressures. The plug is exteriorly threaded for insertion and attachment to the stem and includes a central aperture 19 for extension therethrough of a generally tubular, coaxial wave guide 20.

The wave guide 20 is dimensioned in accordance with the diameter of the pipeline 12 to extend inwardly with one end 22 substantially flush with the open end of the stem portion 14 and with the lower distal end 24 thereof positioned substantially in the center of the opening in the pipeline. Positioned at the lower distal end 24 of the wave guide is a coaxial extension 26 having a threaded bore portion 28 for connection to the wave guide such that the extension is disposed at right angles to the wave guide in parallel relation with the longitudinal axis of the pipe. Essentially, in this type of connection, the extension 26 averts any tendency of the wave guide to produce an unequal propagation of energy through the line. Conventional pipe sealing compounds may be employed at all the joints so as to make the entire connection air tight.

Preferably, microwave energy is applied through the wave guide 20 by a magnetron, not shown, although of course various other types of generating units may be employed, such as a klystron. The entire microwave energy generating unit may be a separate installation apart from the T-head connection itself and when desired to apply microwave energy through the wave guide, a coaxial input 30 may be connected into the hollow wave guide 20 by means of an input plug 32 provided with a female end portion 33 which is exteriorly threaded for insertion inwardly into the stem in abutting relation with the coupling 16 and with an opening 34 aligned for insertion of the end 22 of the wave guide therethrough. A flexible insulated cable 36 is shown leading away from the input plug 32 into the magnetron.

The magnetron or other suitable source will produce microwave charges of alternating current for feeding through the coaxial input into the wave guide 20 whereupon the microwaves, in turn, will be propagated through the coaxial extension into the fluid filled pipeline. The frequency of the energy, as mentioned, is preferably in the microwave region and it has been found that as the frequency of energy is increased, such as on the order of 3000 megacycles and controlled to produce a predetermined wave length in accordance with the dimensions of the pipeline, a skin effect is produced in the line where the energy flow is along the interior surface of the pipeline 12 and extends for considerable distances in either direction from the distal end of the wave guide throughout the pipe. For example, in a 3 inch pipeline, wherein the frequency of the energy is on the order of 3000 megacycles with a wave length of 12 centimeters, the distance of energy transfer in either direction from the coaxial extension has been found to be in excess of 250 feet, these figures being based on using an oil sample which at a frequency of 3000 megacycles has a dielectric loss constant of 3.30 and a dielectric loss tangent of 0.006. Also the energy transfer is practically instantaneous, then is converted into heat by the organic fluid in the line in a matter of minutes. In general, the inside diameter of the pipe is the determinant for the lower limit of the frequency based on calculations of the wave length cut-off point which is the product of 2.61 times the radius in centimeters of the pipe times the square root of the dielectric constant of the fluid medium in the pipe. Actually this equation determines the upper value limit of the wave length and conversely, the lower limit of the frequency. Thus, for crude oil the limits of these settings are based on the dielectric constant of the fluid and this constant may be expected to vary, for example, between a paraffin base crude oil and an asphaltic base crude oil so that the settings for frequency must also be varied. In cases when crude oil is the organic fluid in the line, the variable factor determining efficient use of radio frequency voltage is the dielectric loss constant of the crude oil. This dielectric loss constant will vary with the base nature of the crude oil and the amount and type of water in emulsion.

In addition, it is often desirable to control the distance of propagation of the energy through the pipeline, for example, where the wave guide connection into the line is adjacent to a storage battery or well head, or the pipeline itself varies in dimension, or various obstructions are present in the line causing a substantial increase in impedance to the flow of energy therethrough. In this event, it is desirable to block the flow of energy into such impedances due to the adverse result which may be carried back through the line to cause distortion of the energy transfer therethrough. To this end, a wave guide terminus 40 may be employed just ahead of the obstruction and the terminus may be of a conventional type wherein a plurality of metallic rods 41 are extended radially and inwardly from the interior surface of a union 42. Accordingly, the disposition of the wave guide terminus either at one or both sides of the pipeline in relation to the T-head connection will determine the end point of electrical energy transfer through the line such that the energy is restricted for propagation between each terminus and the coaxial extension.

An additional feature of the present invention is in the nature of the energy transfer through the pipeline as the organic fluids therein undergo an increase in temperature with an accompanying reduction in viscosity and resultant decrease in the dielectric loss constant. Of course, the dielectric constant of the fluids will determine the degree of attenuation of the energy into heat and together therewith the distance of transfer of the energy from the coaxial extension. As the temperature of the fluids increases in response to application of electrical energy its dielectric loss value will decrease such that the zero point of energy transfer through the fluid filled line will gradually increase in distance along the line from the coaxial extension. This will have little effect with respect to the distance of energy transfer upstream from the extension since the organic fluid as it is being heated is continually flowing toward the source of propagation with lower temperature fluids continually replacing and moving through the line. However, the energy transfer downstream from the extension will be in the direction of fluid flow so that as the temperature of the fluid gradually increases in flow along the heated section this will have the effect of increasing the temperature of the fluids for considerable distances downstream with a resultant decrease in dielectric loss and corresponding increase in distance of energy transfer; thus, the zero point of energy transfer is continually increasing in distance from the extension and accordingly will act to fluidize any precipitates collecting along the interior surface of the pipe for great distances downstream from the extension. For this reason, it is advisable to position the T-head connection at a location relatively close to the pump or wellhead connections, for example, since the distance of propagation of the energy upstream from the wave guide connection will be considerably less than that in the downstream direction.

In applying microwave energy to the wave guide 20 a portable generating unit may be employed for connection into the coupling and upon completion of the heating operation may simply be removed leaving only the coupling 16 and wave guide 20 in place. This may be desirable in applications where the organic fluids, such as oil, will not plug the lines when flowing but only during shutdown periods. Accordingly, upon the application of oil at the resumption of flow through the lines, only a short period of microwave application is necessary to thaw and clean the lines and thereafter the unit may be disconnected therefrom. Of course, permanent installations may be provided where continual heating of the lines is necessary for most effective flow and where it is necessary to continually thaw the lines, especially against undesirable precipitation of solid matter along the interior surface thereof. In this connection, it has been found that precipitates such as paraffin can be rapidly fluidized from the solid state by the application of microwave energy without ever reaching the high temperatures normally required to convert the paraffin into a fluid state.

It will be further evident from the above that the present invention is easily adaptable for various applications other than the cleaning and thawing of flow lines and the above is given for purposes of illustration only. As an example thereof, paraffin precipitates often accumulate in tubing columns and in this event microwave energy may be caused to flow along the sucker rods such as by means of a flexible wave guide attached into the polish rod of the tubing string. Another example is found in the application of microwave energy in the cleaning of storage tanks, either in oil fields or in the soap manufacturing industry wherein similar problems of fatty wax precipitation are encountered. In this application, a shielded unit may be inserted in various ways into the interior of the tank and by controlling the frequency and wave length of the energy generated it will be propagated through the low dielectric loss fluid in the tank and dissipated against the metal interior thereof, with the area of greatest heat loss to be found on or near the walls of the tank itself. In such application, it may be desirable to gradually lower the microwave energy unit through the tank whereupon the energy waves will be dissipated in a generally planar or lateral fashion as the tool is progressively lowered therethrough. Moreover, and in the same fashion, the material collecting in the bottom of the tanks at least may be partially fluidized by microwave energy application such that as it becomes loosened it will more easily flow out of the flush or dump valves at the bottom of the tank. Of course, other similar applications are amenable to microwave energy application for conversion into heat and simultaneous breaking down of the solid matter settling from the fluid.

It is therefore to be understood that various changes and modifications may be made in the method and installation of the present invention without departing from the scope thereof as defined by the appended claims.

What is claimed is:

1. The method of reducing the viscosity of crude oil and precipitates thereof flowing in a tube comprising the steps of directing microwave energy through a wave guide connection in a flow tube in a direction parallel to the longitudinal axis of the tube, selectively controlling the frequency and wave length of the energy in accordance with the configuration and size of the tube whereupon the tube acts as a wave guide for the transmission of energy along the interior surface thereof to thereby produce a skin effect in the depolymerization of precipitates collecting on the interior surface along with the attenuation of the energy into heat by the organic fluids flowing therethrough, controlling the length of travel through the tube within a selected distance, and positioning a wave guide terminus between obstructions in the flow tube and the wave guide on at least one side of the wave guide to block the travel of microwave energy through the obstruction.

2. The method of reducing the viscosity of heat fluidizable organic fluids and precipitates thereof in a tube in which the fluids are flowing comprising the steps of directing microwave energy through a wave guide connection in the tube in a direction parallel to the longitudinal axis of the tube, the energy having a frequency and wave length relative to the internal diameter of the tube such that the tube functions as a wave guide for the transmission of energy along the internal surface thereof to produce a skin effect in the depolymerization of precipitates deposited on the internal surface and to reduce the viscosity of the fluids by the formation of heat through the attenuation of energy by the fluids.

3. Means for reducing the viscosity of heat fluidizable organic fluids and precipitates thereof in a tube in which the fluids are flowing comprising in combination with the tube, a wave guide positioned within said tube operative to transmit microwave energy from a source outside the tube into the tube and propagate it is a direction parallel to the longitudinal axis of the tube, the wave length and frequency of the energy having values relative to the internal diameter of the tube such that the tube functions as a wave guide, whereby a skin effect is produced on the internal surface of the tube and attenuation of the energy by the fluids produces heat to reduce the viscosity thereof.

References Cited in the file of this patent

UNITED STATES PATENTS

| | | |
|---|---|---|
| 2,201,472 | Browder et al. | May 21, 1940 |
| 2,219,653 | Krugel | Oct. 29, 1940 |
| 2,537,737 | Chamberlin | Jan. 9, 1951 |
| 2,585,970 | Shaw | Feb. 19, 1952 |
| 2,620,286 | Shaw | Dec. 2, 1952 |
| 2,714,930 | Carpenter | Aug. 9, 1955 |
| 2,757,738 | Ritchie | Aug. 7, 1956 |